(12) United States Patent
Teckentrup et al.

(10) Patent No.: US 8,087,383 B2
(45) Date of Patent: **\*Jan. 3, 2012**

(54) ROTARY MILKING PARLOR FOR THE IDENTIFICATION OF A MILKING STALL AND AN ANIMAL, IN PARTICULAR A COW, IN A ROTARY MILKING PARLOR

(75) Inventors: Rolf Teckentrup, Oelde (DE); Manfred Pohlkamp, Oelde (DE)

(73) Assignee: Gea Farm Technologies GmbH, Bönen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/462,234

(22) Filed: Jul. 31, 2009

(65) Prior Publication Data

US 2009/0301397 A1    Dec. 10, 2009

Related U.S. Application Data

(60) Continuation of application No. 11/470,089, filed on Sep. 5, 2006, now Pat. No. 7,584,715, which is a division of application No. 10/340,908, filed on Jan. 10, 2003, now Pat. No. 7,104,218, which is a continuation of application No. PCT/EP01/07025, filed on Jun. 21, 2001.

(30) Foreign Application Priority Data

Jul. 12, 2000   (DE) .................................. 100 33 706

(51) Int. Cl.
  *A01J 5/00* (2006.01)
(52) U.S. Cl. ..................................... 119/14.04; 119/520

(58) Field of Classification Search ............... 119/14.02, 119/14.04, 14.08, 516, 518, 520
See application file for complete search history.

(56) References Cited

U.S. PATENT DOCUMENTS

| | | | |
|---|---|---|---|
| 3,835,814 A | | 9/1974 | Jacobs et al. |
| 3,934,551 A | | 1/1976 | Sultzberger |
| 4,508,058 A | | 4/1985 | Jakobson et al. |
| 5,203,280 A | | 4/1993 | Nelson |
| 5,784,993 A | * | 7/1998 | Osthues et al. ............ 119/14.04 |
| 5,959,526 A | * | 9/1999 | Tucker ....................... 340/572.1 |
| 5,996,529 A | * | 12/1999 | Sissom et al. .............. 119/14.14 |
| 6,050,219 A | | 4/2000 | van der Lely |

(Continued)

FOREIGN PATENT DOCUMENTS

DE   26 50 741 A1   5/1977

(Continued)

OTHER PUBLICATIONS

English language Translated Description and Claims of DE 37 02 465 A1, European Patent Office's esp@cenet.com database, 5pp, Aug. 11, 1988.

(Continued)

*Primary Examiner* — Kimberly Smith
(74) *Attorney, Agent, or Firm* — Smith Law Office

(57) ABSTRACT

For the determination of the occupancy of a milking stall by an animal, in particular a cow, in a rotary milking parlor with a plurality of milking stalls which are disposed on a rotatable milking platform, a process is proposed in which the identification of the animal only takes place after it has entered the milking stall in which it is supposed to be milked.

12 Claims, 2 Drawing Sheets

U.S. PATENT DOCUMENTS

| | | | |
|---|---|---|---|
| 6,105,536 A | 8/2000 | DeWaard | |
| 6,814,027 B2 | 11/2004 | Hein et al. | |
| 6,883,461 B2 * | 4/2005 | Christensen | 119/14.02 |
| 7,004,112 B2 | 2/2006 | Gorans | |
| 7,073,459 B2 * | 7/2006 | Larsen | 119/51.02 |
| 7,370,604 B2 * | 5/2008 | Van Den Berg et al. | 119/14.02 |

FOREIGN PATENT DOCUMENTS

| | | | |
|---|---|---|---|
| DE | 37 02 465 A1 | 8/1988 | |
| DE | 195 21 569 A1 | 1/1997 | |
| EP | 0 300 115 A1 | 1/1989 | |
| EP | 0 689 761 A1 | 1/1996 | |
| EP | 0 689 762 A1 | 1/1996 | |
| EP | 0 763 970 B1 | 9/1998 | |
| EP | 0 717 590 B1 | 6/2007 | |
| GB | 1 569 586 | 6/1980 | |
| WO | WO 00/74472 A1 | 12/2000 | |

OTHER PUBLICATIONS

English language Abstract, Translated Description and Claims of DE 195 21 569 A1, European Patent Office's esp@cenet.com database, 3pp, Jan. 2, 1997.

English language Abstract, Translated Description and Claims of EP 0 300 115 A1, European Patent Office's esp@cenet.com database, 9pp, Jan. 25, 1989.

English language Abstract, Translated Description and Claims of EP 0 717 590 B1, European Patent Office's esp@cenet.com database, 4pp, Jun. 18, 2007.

English translation of DT 26 50 741, pp. 10, May 18, 1977.

* cited by examiner

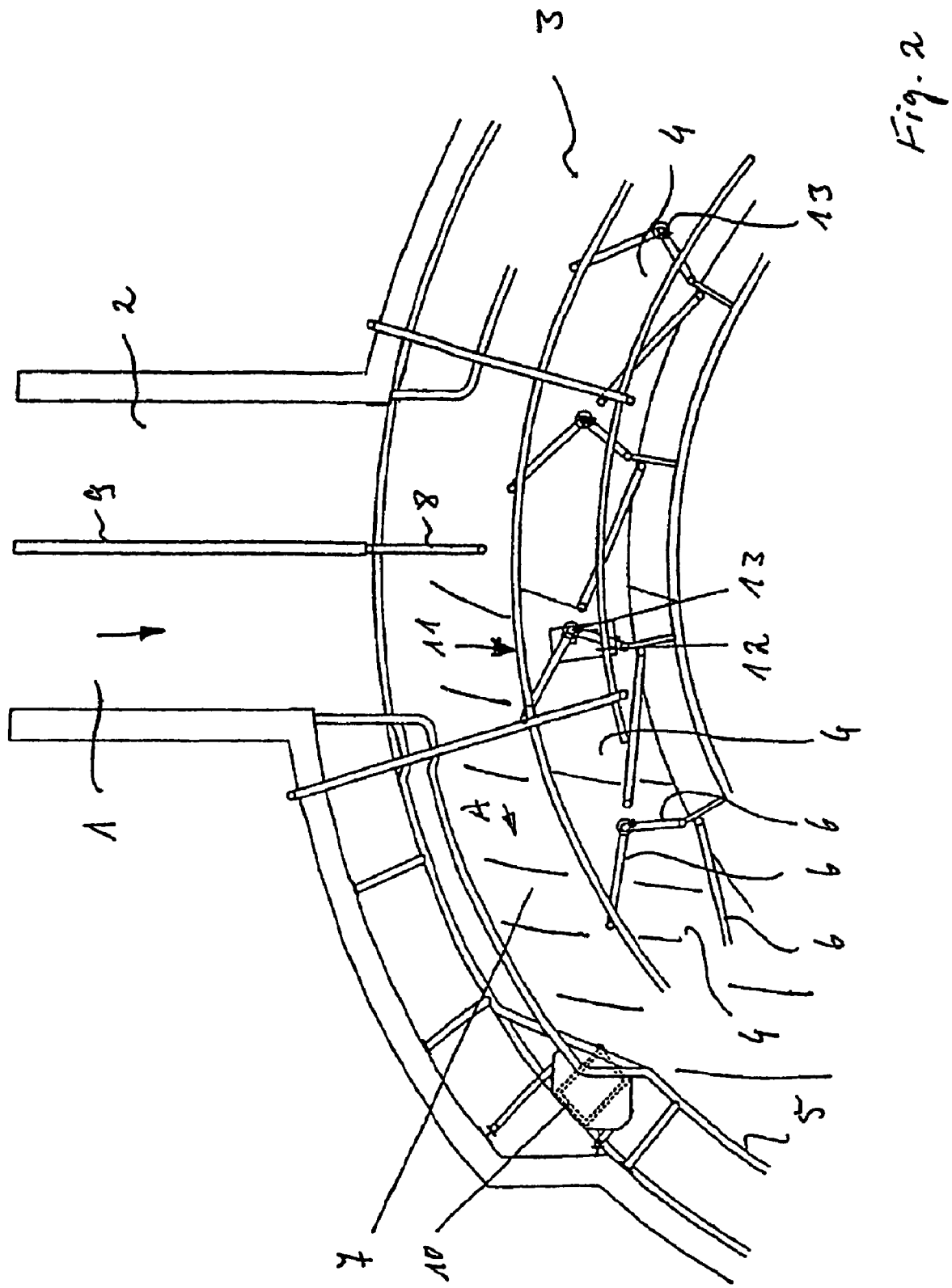

ROTARY MILKING PARLOR FOR THE IDENTIFICATION OF A MILKING STALL AND AN ANIMAL, IN PARTICULAR A COW, IN A ROTARY MILKING PARLOR

This is a continuation of application Ser. No. 11/470,089, filed Sep. 5, 2006, which is a divisional application of application Ser. No. 10/340,908, now U.S. Pat. No. 7,104,218 that issued on Sep. 12, 2006, which is a continuation of International Application PCT/EP01/07025 filed Jun. 21, 2001 which claims priority on German Application No. DE 100 33 706.06 filed Jul. 12, 2000.

FIELD AND BACKGROUND OF THE INVENTION

The object of the invention relates to a process and a rotary milking parlor for the identification of a milking stall and an animal, in particular a cow, in a rotary milking parlor with a plurality of milking stalls which are disposed on a rotatable platform.

Rotary milking parlors for the milking of animals, in particular for the milking of cows, are known in the art. Rotary milking parlors of this type can be of different designs. For example, DE 26 50 741 A1 discloses a rotary milking parlor which has several milking stalls. The milking stalls are disposed side by side. Those skilled in the art speak of a side-by-side rotary milking parlor. In the case of this type of milking parlor, the animals are led radially inwards to the milking stalls. To this end, a gate, which makes possible entry into the milking stall, is drawn upwards. After the cow has entered the milking stall the gate is run down again.

The advantage of such a rotary milking parlor is that a large number of milking stalls can be disposed in a small space.

EP 0 763 970 B1 discloses another type of rotary milking parlor. This rotary milking parlor is a parlor with a plurality of milking stalls disposed in a fishbone pattern, and the milking stalls are disposed on a rotatable milking platform.

In the course of the automation of the milking as well as the monitoring of the animals with respect to their milk production and health, it is a known practice for the animals to be provided with an animal recognition unit. The animal recognition unit can, for example, be a neck/foot rescounter or a neck responder which contains the identification code for the animal. Other animal recognition units are also possible.

In order to be able to carry out the assignment of an animal to a milking stall of a rotary milking parlor, an entrance door is provided in the entrance path of the rotary milking parlor. The recognition of the animal occurs in front of the entrance door. After the recognition of the animal and the identification of the milking stall provided for this animal, the door opens when the milking stall is located in front of the entrance path so that the animal can enter this milking stall. The door closes the entrance so that the following animal is held back.

It is problematic in a process management of this type that each individual animal must be stopped in front of the door so that a reliable matching of the milking stall and the animal to be milked at this milking stall is possible. This leads to a reduced throughput per unit of time and thus to longer milking times. The opening and closing of the door is associated with the development of noise and wear and tear.

This constellation of problems has already been recognized. Thus, rotary milking parlors are also known which have no door in their entrance path or whose door is taken out of operation in certain phases of milking. In rotary milking parlors of this type, the recognition of the animal occurs in the entrance path. In so doing it cannot be determined unambiguously whether an animal actually enters the milking stall provided. There is thus the danger that an animal's non-marketable milk, which in fact should be thrown away, is nevertheless conducted into the marketable milk, since the animal did not enter the milking stall provided for that animal but rather another milking stall. This situation can lead to all the usable milk having to be thrown away.

Proceeding from this, the goal set for the present invention is to specify a process and a rotary milking parlor by which higher reliability with respect to the identification of a milking stall and an animal, in particular a cow, and the assignment of the animal to the milking stall is achieved.

SUMMARY OF THE INVENTION

This objective is realized by the present invention for the identification of a milking stall and an animal, in particular a cow, at the milking stall of a rotary milking parlor with a plurality of milking stalls which are disposed on a rotatable milking platform as well as with an entrance path. The invention is distinguished by the fact that an animal with an animal recognition unit arrives at the milking stall. The animal and the milking stall in which the animal is located are subjected to a recognition process, in which recognition data for the animal and the milking stall are supplied to a data processing system and evaluated there. The data processing system transfers the animal data relevant to the animal to the terminal of the identified milking stall. Through this process management, according to the invention, an unambiguous identification of an animal and its assignment to a milking stall can be achieved. Thereby it is insured that a reliable animal monitoring during the milking process and a reliable matching of milking stall and milked animal is achieved. Due to the fact that each animal can enter unhindered, i.e., not through a door in the entrance path as is the case in the state of the art, an increased throughput per unit of time is achieved. A further advantage of the process according to the invention can be seen in the fact that complicated control of the rotary milking parlor can be omitted since, for example, the opening/closing of a door at the right moment is no longer required. The animal can choose a free milking stall.

According to an advantageous extension of the process according to the invention it is proposed that the milking platform with the animal is passed by a fixed unit for animal recognition, which is disposed behind the entrance path as observed in the direction of rotation of the milking platform. Through this advantageous development of the process it is insured in a simple manner that an unambiguous assignment of an animal to a milking stall can occur since the recognition of the animal only occurs after the animal has already occupied the milking stall. The determination of the milking stall can occur independently of the speed of rotation of the milking platform, the distance of the animal from the entrance path in which the animal necessarily has to enter a milking stall, and the spacing of the milking platforms. Preferably the determination of the milking stall is done by means of a measuring apparatus through which the turning angle of the milking platform, and thus the milking stall, is determined in front of the entrance to the carousel.

To simplify the process it is proposed that in addition to the identification of the animal, recognition of the milking stall is also done by a unit for milking stall recognition. The unit is preferably formed by a transmitter/receiver unit. In particular, it is proposed that the identification of the animal and the milking stall occur in close proximity in time.

According to a further inventive concept, a rotary milking parlor with a plurality of milking stalls, disposed on a rotatable platform, and with an entrance path is proposed which is distinguished by the fact that a fixed unit is provided for animal recognition which is disposed behind the entrance path, as observed in the direction of rotation of the milking platform, so that an unambiguous assignment of an animal to a milking stall is possible.

In particular, it is proposed that a unit for the recognition of the milking stall is provided. This recognition unit has fixed recognition means and recognition means rotating entrained with the milking stall.

The identification of the animal and the milking stall occurring in close proximity in time can be accomplished by the rotary milking parlor having a fixed unit for animal recognition and a fixed unit for milking stall recognition which are disposed adjacent to one another. Preferably the fixed unit for animal recognition and the fixed recognition means for the identification of the milking stall form one unit where the unit for animal recognition and the unit for identification are formed so that a reciprocal negative effect does not take place.

For an unambiguous recognition as well as for the simplification of the effort in construction to form the rotary milking parlor, it is proposed that the fixed unit is disposed to the side of the platform. The lateral disposition can occur on the outer side and/or on the inner side of the milking platform. The vertical position of the fixed unit for the animal identification can be dependent on the identification means which the animal carries.

According to a further advantageous development of the rotary milking parlor according to the invention it is proposed that the fixed unit and/or the fixed recognition means is/are disposed below and/or above the milking platform. The rotary milking parlor is preferably a milking parlor with a plurality of milking stalls disposed in a fishbone pattern. Other forms and developments of the rotary milking parlor are also possible. Also the process according to the invention is to be used preferentially in the case of a rotary milking parlor which has a plurality of milking stalls disposed in a fishbone pattern.

BRIEF DESCRIPTION OF THE DRAWINGS

Further details and advantages of the method as well as of the rotary milking parlor will be explained with the aid of the preferred embodiment examples represented in the drawings.

FIG. 2 is schematic view of a second embodiment a rotary milking parlor in accordance with the present invention.

DETAILED DESCRIPTION OF THE PREFERRED EMBODIMENTS

Figure 1:
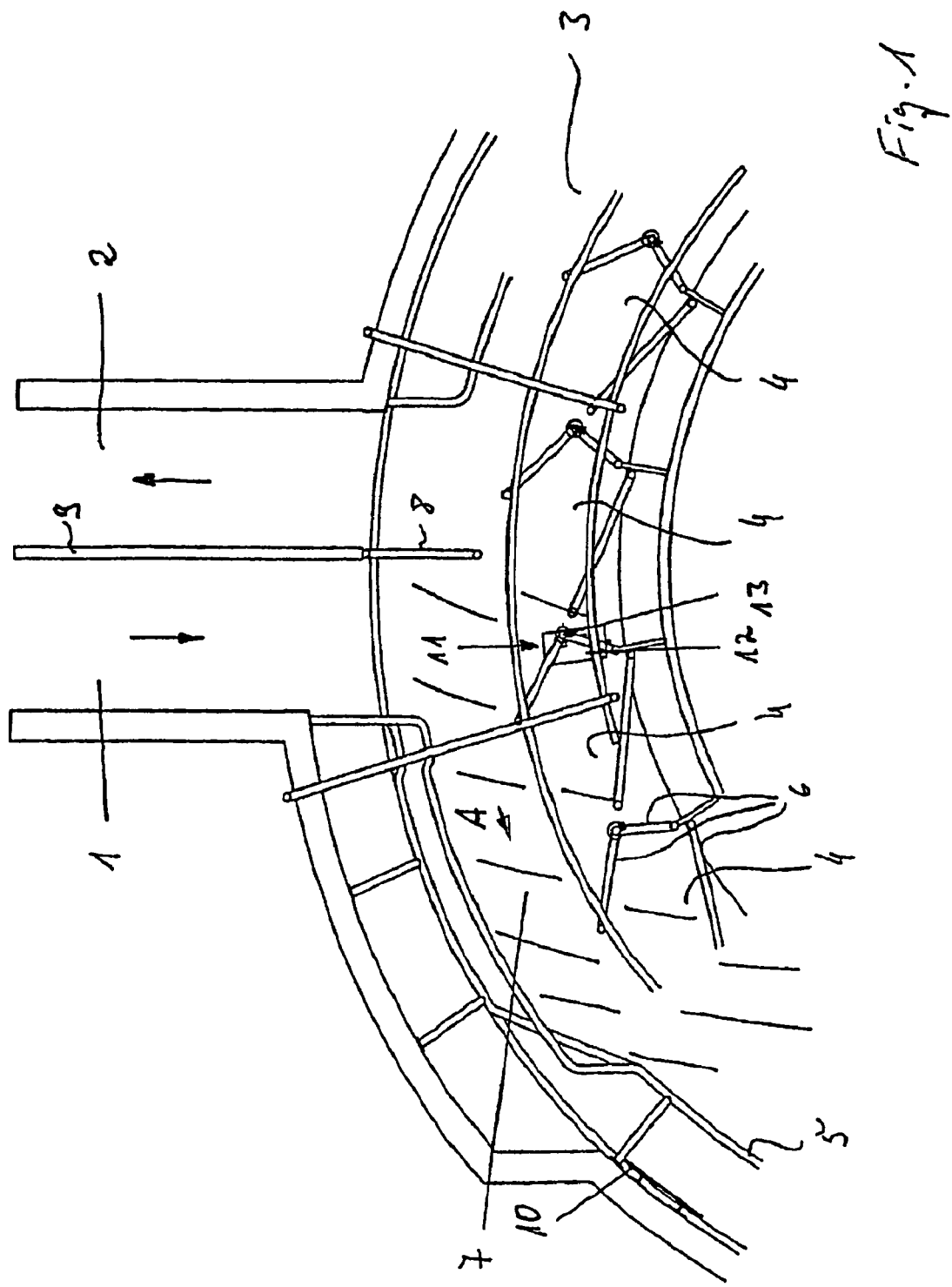
FIG. 1 is schematically view of a first embodiment of a rotary milking parlor in accordance with the present invention.

FIG. 1 shows, schematically and in plan view, a section of a rotary milking parlor. The rotary milking parlor has an entrance path 1 to a rotating milking platform 3. The direction of rotation of the milking platform 3 is represented in FIG. 1 by an arrow A. An exit path 2 runs parallel to the entrance path 1. The entrance path 1 and the exit path 2 are separated from one another by a separating wall 9. On the face, adjacent to the milking platform 3, of the separating wall 9, a divider 8 is provided which can be pivoted about a vertical axis. The divider 8 projects above the milking platform 3 into the stall area for the animals.

According to the preferred embodiment example, several milking stalls 4, arranged in a fishbone pattern, are formed on the rotary milk platform 3. Each milking stall 4 is formed by a milking stall partition 6. The milking stall partition 6 is formed essentially in the shape of a U. The milking stall partitions are open to the outer perimeter area of the milking platform 3. They are formed by railings in a known manner. The outer area of milking stalls 6 is formed by a stationary outer partition 5. Other forms and embodiments of the milking stall partition are also possible.

As observed from the entrance path 1 and in the direction of rotation of the milking platform 3, the entrance path 1 changes into a receiving area 7. The receiving area 7 is represented in FIG. 1 as hatched. This receiving area 7 narrows as observed in the direction of rotation of the milking platform 3. A fixed unit 10 for animal identification is disposed behind the receiving area 7. In the embodiment example represented, the fixed unit 10 is disposed at the side of the milking platform 3 and essentially in a vertical plane. In the embodiment example represented, the fixed unit for animal identification is placed behind the receiving area 7. This is not absolutely necessary. The fixed unit 10 for animal identification can also be disposed next to the receiving area 7. It is essential that the stationary unit 10 for animal identification is disposed in an area of the rotary milking parlor such that an unambiguous assignment of the animal identified to a particular milking stall is made possible.

A unit for the identification of a milking stall 4 is denoted by the reference number 11. The unit 11 for the recognition of a milking stall 4 has fixed recognition means 12. Furthermore, the unit 11 for the recognition of a milking stall 4 has recognition means 13 rotating entrained with a milk stall 4. The recognition means 13 is preferably provided for each of the milking stalls 4. The unit for the recognition of a milking stall is preferably built in the form of a sending/receiving unit. Other embodiments are possible.

If an animal, in particular a cow, enters the entrance path 1, it can enter the milking platform 3 unhindered. It can arrive at the narrowing receiving area 7. Through the rotation of the milking platform 3, the animal located in the receiving area 7 is captured by the milking stall partition 6 and led in such a manner that the animal is positioned at the milking stall 4. The animal located in the milking stall 4 is passed by the fixed unit 10 for identification of the animal. The animal, which carries a recognition element, is identified by the fixed unit 10. The identification code for the animal and that of the milking stall is passed to a data processing system not represented. The data processing system then transmits the relevant animal data to the milking stall terminal of the stall at which the animal to be milked is located. Subsequently the milking process as such can be carried out. Unit 11 serves for the assignment of the recognized animal to a certain milking stall. Through the fixed recognition means 12 and the recognition means 13 assigned to a certain milk stall and rotating entrained with it, the milk stall in which the animal arrived is identified. In FIG. 1 it is shown that the unit 11 for the recognition of the milk stall, as observed in the direction of rotation of the milking platform 3, is disposed in front of the fixed unit 10 for the recognition of the animal. This is not absolutely necessary. The fixed recognition means 12 of the unit 11 for the recognition of the milking stall can also be disposed adjacent to the fixed unit 10 for the recognition of the animal. Disposition behind it is also possible. The adjacent disposition of fixed recognition means of the unit for the recognition of the milking stall as well as the fixed unit for the recognition of the animal is preferably done in such a way that, depending on the mode of operation of the unit for the recognition of the milking stall and the unit for the recognition of the animal, a reciprocal effect can be ruled out. This is to be taken into account in particular if, according to an advantageous development of the device according to the invention, the fixed unit for the recognition of the animal and the fixed unit for the recognition of the milking stall form one unit.

After the animal has been milked and the milking platform 3 with the animal comes to be adjacent to the exit path 2, the animal can exit from the milking stall 4. In so doing, the divider 8, which projects out in the direction of travel of the animal, causes the animal to leave the milking stall 4.

In the embodiment example represented, the fixed unit 10 for the recognition of the animal is disposed so that it is suitable for the identification of neck responders and neck rescounters which the animals carry.

FIG. 2 shows a second embodiment example of a rotary milking parlor in plan view. The layout of the rotary milking parlor according to FIG. 2 conforms in principle to the layout of the rotary milking parlor according to FIG. 1. Thus, we refer to the description of the rotary milking parlor according to FIG. 1 in its full extent.

The rotary milking parlor according to FIG. 2 differs from the rotary milking parlor according to FIG. 1 by the disposition of the fixed unit 10 for the recognition of the animal. In the embodiment example represented according to FIG. 2 the fixed unit 10 is disposed laterally. The fixed unit 10 is a unit which works together with identification means disposed on the foot of the animal. The fixed unit 10 is built in the form of recognition means which is disposed essentially in a horizontal plane.

Certain modifications and improvements will occur to those skilled in the art upon a reading of the foregoing description. All such modifications and improvements of the present invention have been deleted herein for the sake of conciseness and readability but are properly within the scope of the following claims.

The invention claimed is:

1. A rotary milking parlor comprising:
   a rotary milking platform and the rotary milking platform includes,
      a plurality of milking stalls disposed on the rotary milking platform, and
      a rotating receiving area adjacent to at least one milking stall; and the rotary milking parlor further comprises:
   stationary entrance path leading to the rotating receiving area;
   an exit path leading away from the rotary milking platform; and
   an animal recognition unit mounted in a fixed location in the stationary entrance path and adjacent to the rotating receiving area for recognizing an animal that is in a milking stall.

2. The rotary milking parlor of claim 1, and further comprising:
   a milking stall recognition unit disposed to recognize a milking stall which an animal has at least partially entered.

3. The rotary milking parlor of claim 2, wherein the milking stall recognition unit is disposed at a fixed location.

4. The rotary milking parlor according to claim 2, wherein the animal recognition unit and the milking stall recognition unit are disposed adjacent to one another.

5. The rotary milking parlor according to claim 2, wherein the animal recognition unit and the milking stall recognition unit are a single unit.

6. The rotary milking parlor according to claim 2, and further comprising a milker unit that is activated after an evaluation of data received from the animal recognition unit and the milking stall recognition unit.

7. The rotary milking parlor according to claim 2, wherein the milking stall recognition unit comprises a rotating component that is disposed on an inner side of the milking platform.

8. The rotary milking parlor according to claim 2, wherein the milking stall recognition unit comprises a rotating component that is disposed above the milking platform.

9. The rotary milking parlor according to claim 1, wherein the animal recognition unit is disposed on an outer side of the rotary milking platform.

10. The rotary milking parlor unit according to claim 1, wherein the animal recognition unit is disposed above the rotary milking platform.

11. The rotary milking parlor according to claim 1, and further comprising a milker unit that is activated after an evaluation of data received from the animal recognition unit.

12. The rotary milking parlor of claim 1, wherein the receiving area is open to the entrance path without a door or a gate to stop an animal from moving from the entrance path to the receiving area.

* * * * *

UNITED STATES PATENT AND TRADEMARK OFFICE
CERTIFICATE OF CORRECTION

PATENT NO.          : 8,087,383 B2
APPLICATION NO.     : 12/462234
DATED               : January 3, 2012
INVENTOR(S)         : Rolf Teckentrup and Manfred Pohlkamp It is certified that error appears in the above-identified patent and that said Letters Patent is hereby corrected as shown below:

Col. 5, claim 1, line 43 omits "a"; and should read as follows:

a stationary entrance path leading to the rotating receiving

Signed and Sealed this
Third Day of July, 2012

David J. Kappos
*Director of the United States Patent and Trademark Office*